C. M. MANLY.
CONTROL APPARATUS FOR POWER DRIVEN MECHANISMS.
APPLICATION FILED SEPT. 20, 1909.

1,112,632.

Patented Oct. 6, 1914.
5 SHEETS—SHEET 1.

Attest:

Inventor:
C. M. Manly
Attys

UNITED STATES PATENT OFFICE.

CHARLES MATTHEWS MANLY, OF BROOKLYN, NEW YORK.

CONTROL APPARATUS FOR POWER-DRIVEN MECHANISMS.

1,112,632.

Specification of Letters Patent.

Patented Oct. 6, 1914.

Application filed September 20, 1909. Serial No. 518,649.

*To all whom it may concern:*

Be it known that I, CHARLES MATTHEWS MANLY, a citizen of the United States, residing at Brooklyn, county of Kings, State of New York, have invented certain new and useful Improvements in Control Apparatus for Power-Driven Mechanisms, of which the following is a full, clear, and exact description.

My present invention relates to control apparatus for power driven mechanisms, especially in its application to gun pointing.

My object is to provide simple and effective means in such mechanisms as that designated for enabling the operator to control the movements of the power driven mechanism as accurately and quickly as lighter mechanisms can be operated by hand.

Another object is to provide means whereby the control of the power driven mechanism is practically unaffected by the distance of the operator from the power which operates it. And a further object is to provide means whereby the control of the power driven mechanism will be unaffected whether the relative positions of the operator and the power operating apparatus be fixed or movable.

With these and other objects in view, my invention consists of a variable speed gear connecting a source of power to a mechanism to be operated, means for varying the speed of the said gear, and a manually operatable mechanism for controlling the variations in speed of the said gear, and my invention further consists in the novel construction and details thereof with reference to the accompanying drawings, as hereinafter described, and more particularly pointed out in the claims.

I am aware that guns have already been pointed by power operated mechanism, including variable speed gears, with more or less complicated mechanical connections between the control mechanism of the said gears and the operator. I am also aware, that the variations in speed of the said gears has also been controlled to an extent by mechanism operated by an electric motor with means for enabling the operator to maintain a certain degree of control of the said electric motor. However, in some cases direct mechanical connections between the control mechanism of the variable speed gear and the operator are impracticable and in other cases they introduce difficulties due to lost motion in the joints of the said mechanical connections. It is also well known that the control of the motions of an electric motor are more or less approximate and therefore with such a motor for operating the control apparatus of a variable speed gear, the control of the said gear must be approximate to the same or a greater extent.

In the pointing of large guns it is highly desirable that the operator have complete and accurate control of the movement of the gun, not only to the minutest fraction of a degree of arc, but also that the motions of the gun be practically instantaneous and in synchronism with the motions of the operator's hands.

In my improved control apparatus I provide the variable speed gear, (which is preferably of the type wherein a hydraulic motor is operated by fluid delivered to it by a variable stroke pump), with one or more cylinders containing hydraulically operated pistons through which the variations in speed are effected, and I provide the operator with means for forcing a fluid into the said cylinders for operating the said pistons, whereby he may move the speed varying means to an extent exactly proportional to the amount of fluid forced into said cylinders.

While I prefer to use my new control mechanism in combination with a variable speed gear of the type shown and described in my Letters Patent No. 801097, yet I do not confine myself to such a combination, but for convenience I have shown such a gear in the accompanying drawings as hereinafter explained.

In the drawings which illustrate a preferred form in which my invention may be carried out.

Referring now to the drawings in which the same reference characters relate to the same or corresponding parts in all the views, the numeral 10 indicates portions of the frame of a boat and 11 the deck thereof. Supported on the frame 10 is the stationary armor belt 12. Supported also by the frame 10 is the circular trestle work 13 on which is mounted the stationary circular track 14, which through the rollers 15 supports the movable track 16, which through the circular trestle work 17 in turn supports the rotatable armor belt 18, the parts 16, 17 and 18 being fastened together to turn as a unit together with the guns 19 and ammunition hoist 20, which are supported thereby by means not shown. Formed on the inner side of the circular track 16 are internal gear teeth 21 which mesh with the teeth of the pinion 22 formed on the upper end of the vertical shaft 23 which, by means of the bearing box 24, is anchored to the stationary track 14. The lower end of the shaft 23 passes through the housing 25 being journaled in the bore of the hub 26 thereof. The shaft 23 terminates at its lower end in a worm wheel 27 with which meshes the worm screw 28 formed on the horizontal shaft 29 which is journaled in the said housing 25 and which is continued at the right thereof, in Figs. 1 and 2, to form the crank shaft of the hydraulic motor 30. The said motor 30 is supported from the frame 10 by the pedestal 31 and connected to the right hand side of the motor 30, by pipes hereinafter described, is a hydraulic pump 35 which is supported by the pedestal 36. Connected to the right hand end of the pump crank shaft 37 by the coupling 38 is the shaft 39 of the electric motor 40.

With the electric motor 40 driven by a suitable supply of electric current, the rotatable parts of the turret may, through the mechanisms just described, be rotated at any desired speed in either direction or stopped at any position by properly controlling the speed gear, and without in any way affecting the speed of rotation of the said electric motor. In order to more clearly explain the construction and operation of the control mechanism, I will first briefly describe the variable speed gear as here shown.

Figure 3:
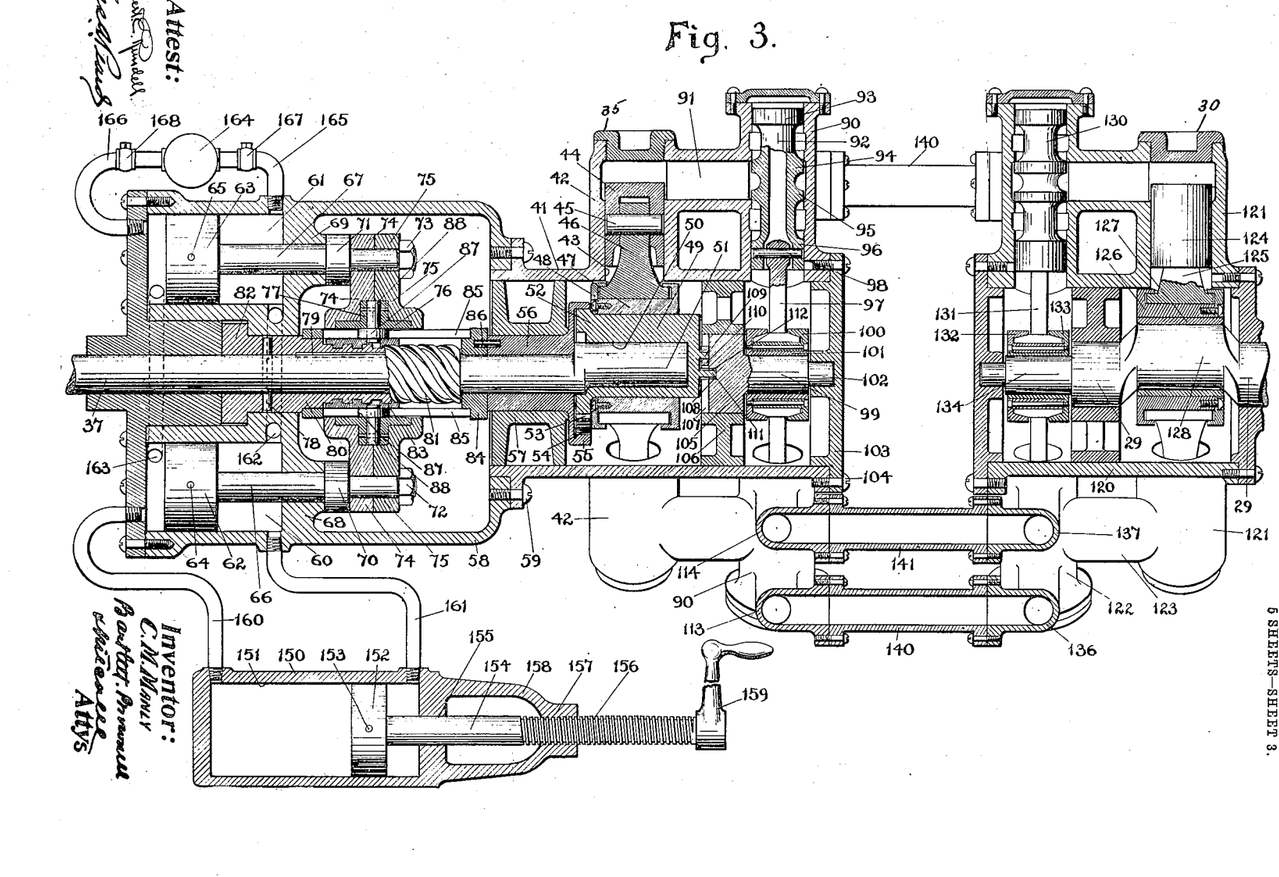
Fig. 3 is a longitudinal sectional view of the hydraulic variable speed gear for driving the turret with the addition thereto of a simple form of pump for operating the control mechanism therefor.

Referring now to Fig. 3, the hydraulic pump 35 is shown at the left and the hydraulic motor 30 at the right. The said pump comprises a main casting 41 embodying multiple radial cylinders 42 in the bores 43 of which are slidably mounted pistons 44, which through the pins 45, pitman rods 46, floating ring 47 and retaining ring 48 are all connected to a single bushing 49 which for convenience I term the eccentric bushing, since it embodies a bore 50 eccentrically disposed with reference to the exterior circumference thereof. The eccentric bushing 49 is rotatably mounted on the crank pin 51 formed integral with, but eccentrically disposed with reference to, the crank shaft 37. For reasons later explained, the eccentricity of the crank pin 51 with reference to the crank shaft 37 is made equal to the eccentricity of the bore 50 of the bushing 49 with reference to the exterior circumference thereof. Formed integral with the left hand end of the eccentric bushing 49 is a collar 52, the exterior circumference of which is concentric with the bore 50, and consequently with the crank pin 51. Formed in the exterior circumference of the collar 52 are spur gear teeth 53, which mesh with the internal teeth 54 formed in the interior circumference of the annular ring 55, which in turn is formed integral and concentric with the bushing 56. The exterior circumference of the bushing 56 is journaled in the bearing 57, while the crank shaft 37 is journaled in the bore of the said bushing 56.

Mounted on the left hand end of the main casting 41 of the pump is a casing 58 secured thereto by the screws 59. Formed in the left hand end of the casing 58 are two hydraulic cylinders 60 and 61, respectively, in which are mounted pistons 62 and 63, respectively, which are secured by the pins 64 and 65, respectively, to the piston rods 66 and 67, respectively. The piston rods 66 and 67 pass through and are slidably mounted in the heads 68 and 69 of their respective cylinders. Formed on the rods 66 and 67 are collars 70 and 71, respectively, and secured to the rods 66 and 67 between the nuts 72 and 73 and the collars 70 and 71 respectively, are the two half yokes 74 and 75. The shape of the yokes 74 and 75, when viewed from either end of the drawing, is that of a circular hub with projecting ears, the piston rods 66 and 67 being secured to the said ears. Formed in the interior of the hub of the yokes 74 and 75 are annular recesses in which is rotatably mounted a ring 76 embodying a collar 77. Mounted on the crank shaft 37 and secured thereto by the pin 78 and key 79 is a sleeve 80 provided with exterior screw threads 81, the left hand end of the said sleeve 80 terminating in a shoulder 82. Mounted on the screw threads 81 is a nut 83 and surrounding the said nut 83 is a sleeve 84 provided with diametrically opposite longitudinal slots 85, the right hand end of the said sleeve 84 being provided with a pin 86 by which it is secured to the end of the bushing 56, previously described. Mounted in the longitudinal slots 85 of the sleeve 84 are rollers 87 which are journaled on the pins 88, the said pins 88 passing through the collar 77 of the ring 76, the rollers 87 and the nut 83, so that these parts will remain fixed with reference to each other against longitudinal or rotary displacement.

Formed on the right hand portion of the main casting 41 are multiple radial valve chambers 90 equal in number and in alinement with the cylinders 42, each valve chamber being connected to its respective cylinder by a passage 91. Mounted in each of the valve chambers 90 is a piston valve 92 embodying the four heads 93, 94, 95 and 96, and each valve is connected by means of a pitman rod 97 and pin 98 to a single valve crank 99, the ends of the pitman rods 97 being held in their proper position with reference to the said crank by the telescoping sleeves 100 and 101, which are rotatably mounted on the said valve crank 99, the pitman rods 97 being free to slide around on the said telescoping-sleeves 100 and 101. The valve crank 99 terminates at its right hand end in a small journal 102, which is rotatably mounted in the cap 103 which by means of the screws 104 closes the end of the main casting 41. The left hand end of the valve crank 99 terminates in an enlarged journal 105 which is rotatably mounted in the bearing 106. Formed in the left hand face of the enlarged journal 105 is a vertical slot 107 and at right angles to this, but cut deeper into the face of the said journal, is another slot 108. Formed on the end of the eccentric bushing 49 and concentric with the exterior circumference thereof is a pin 109, and rotatably mounted on the said pin 109 is a rectangular shoe 110 which is slidably mounted in the vertical slot 107. On the same end of the eccentric bushing 49, and situated at a point which is concentric with the center of the crank shaft 37 when the eccentric bushing 49 is in the position shown in Fig. 3, is a second and longer pin 111, on which is rotatably mounted a rectangular shoe 112 which is slidably mounted in the slot 108. The position of the slots 107 and 108, in the face of the journal 105 of the valve crank 99, is so chosen that with the parts in the positions shown in Fig. 3 the throw of the valve crank 99 is at right angles to the throw of the pump crank, (the latter being the combined eccentricity of the crank pin 51 with respect to the crank shaft 37 and the eccentricity of the exterior circumference of the eccentric bushing 49 with respect to the said crank pin 51), and the function of the slots 107 and 108 coacting with the pins 109 and 111 formed on the end of the eccentric bushing 49 is to keep the throw of the valve crank pin always at right angles to the throw of the pump crank, the necessity for it being explained in my Letters Patent #801097, and the functioning of the said slots and pins in accomplishing this object being explained in detail in my application for Letters Patent Serial No. 399989 filed Oct. 31, 1907.

All of the multiple valve chambers 90 are connected together near their outer ends by a circular manifold passage 113 which enters each of them at a point situated between the head 93 and the head 94 of the valve 92 mounted therein, and the said valve chambers are again all connected together near their inner ends by a second manifold passage 114 which enters each of the valve chambers at a point between the head 95 and the head 96 of the said valve 92.

The hydraulic motor 30, shown at the right of the pump in Fig. 3, comprises a main casting 120 which is practically a duplicate of the main casting 41 of the pump 35, there being multiple cylinders 121, for each one of which there is a valve chamber 122 connected thereto by the passage 123, the pistons 124 through their pitman rods 125 and the floating ring 126 and bushing 127, being connected to the crank pin 128 formed integral with, but eccentric to, the crank shaft 29. Similarly the valves 130 through their pitman rods 131 and the telescoping sleeves 132 and 133 are connected to the valve crank pin 134 formed integral with, but eccentric to, the crank shaft 29, the throw of the said valve crank pin 134 being at right angles to the throw of the motor crank pin 128. The multiple valve chambers 122 are connected together by the manifold passage 136 and also by the manifold passage 137. The outer manifold passage 136 of the motor is connected to the outer manifold passage 113 of the pump by the pipes 140, and the inner manifold passage 137 of the motor is connected to the inner manifold passage 114 of the pump by the pipe 141.

All the ports, passages, cylinders and valve chambers of the pump and the motor being filled with fluid, rotation of the pump shaft 37 will cause the pistons 44 to force the said fluid under pressure from the pump over to the motor, where acting on the pistons 124 the said fluid pressure so generated will cause the motor shaft 29 to revolve at a speed dependent on the volume of fluid so sent over from the pump, and as the motor turns under the influence of such fluid pressure an equal amount of fluid will be forced out from the motor cylinders 121, through the ports and passages, from which it will be carried over to the pump which will draw it in to such cylinders as are then in the course of their suction strokes, the fluid thus being circulated from pump to motor and back to the pump in a closed circuit. When it is desired that the motor run at a lower speed with reference to the pump, the yokes 74 and 75 may be pushed to the right in Fig. 3, thus causing the nut 83 to be forced in the same direction along the screw threads 81, but the rollers 87 in the longitudinal slots 85 cause the slotted sleeve 84 to be rotatably adjusted with reference to the shaft 37 in proportion to the pitch of the threads 81 and the longitudinal displacement of the nut 83 thereon. Such rotary adjustment of the said slotted sleeve 84 acting through the pins 86, sleeve 56 and internal gear teeth 54 coacting with the spur gear teeth 53 on the eccentric bushing 49, causes the said eccentric bushing to be rotatably adjusted to a proportional amount on the crank pin 51, the eccentricity of the said eccentric bushing thereby tending to counteract the eccentricity of the crank pin 51 with respect to the crank shaft 37. If the eccentric bushing 49 be rotated on the crank pin 51, 180 degrees from the position shown in Fig. 3 the two eccentricities will then neutralize each other and the exterior circumference of the said eccentric bushing 49 will be exactly concentric with the shaft 37, and consequently any rotation of the shaft 37 with the eccentric bushing in this position will produce no reciprocation of the pistons, and consequently no fluid pressure will be generated by the pump. When the eccentric bushing is in the position just described there is at this mathematical point of zero stroke, no angularity between the throw of the valve crank and the throw of the pump crank, since the pump crank has no throw. As soon, however, as the eccentric bushing is rotated the slightest amount more than 180 degrees from the position shown in the drawing, the pump crank will again have stroke, but the angular position of the valve crank with respect to the pump crank will be 180 degrees from the previous position which it occupied, where they were 90 degrees apart. The result of this is that if the valve crank at first was, say 90 degrees ahead of the pump crank in the direction of rotation, the said valve crank will be 90 degrees behind the pump crank after the crank stroke has been passed through the zero point. The result of this is that in passing through zero the direction of flow of the fluid from the pump to the motor will be reversed, the fluid in the latter case flowing from the pump to the motor through the passages which in the former case conveyed the fluid back from the motor to the pump, and similarly the passages which in the former case carried the fluid from the pump to the motor will in the latter case convey the fluid from the motor back to the pump. Such a reversal of flow of the fluid causes the motor to reverse its direction of rotation, and as the pump crank is still further adjusted beyond the zero point, its stroke may be increased up to the point where it is again a maximum and the motor is therefore at its highest speed, but in the reverse direction.

With the yokes 74 and 75 at the extreme left hand limit of their adjustment as shown in Fig. 3, and with the valve crank pin 99 of the pump in the angular position there shown with reference to the pump crank pin 51, and the valve crank pin 134 of the motor also in the angular position there shown with reference to the motor crank pin 128, the motor crank shaft 29 will be rotated at its maximum speed and in the same direction as the pump crank shaft 37 is rotated. When the said yokes 74 and 75 are moved to the extreme right hand limit of their adjustment, the motor crank shaft 29 will be rotated at its maximum speed but in the opposite direction from that in which the pump crank shaft 37 is rotated. At the mid point in its adjustment, between these extreme limits, the pump will be at zero stroke and consequently rotation of the pump crank shaft 37 will not produce rotation of the motor crank shaft 29. Intermediate positions of the yokes 74 and 75, either side of the mid point, cause the motor shaft to be rotated at correspondingly intermediate speeds, there being no speed in either direction between the limits of maximum and zero that can not be given to the motor shaft by proper adjustment of the said yokes.

In order, therefore, to properly control the speed and direction of rotation of the motor shaft it is only necessary to properly adust the yokes 74 and 75. This may be accomplished by various means, some of which I have already described in my previous patent and application above referred to. In the present control apparatus I prefer to effect it by fluid pressure introduced into the cylinders 60 and 61, previously described, the pistons 62 and 63 in the said cylinders being connected to the said yokes. The simplest form of device for introducing such fluid pressure into the cylinders 60 and 61 is shown at the left hand lower side of Fig. 3, and comprises a cylinder 150 in the bore 151 of which is slidably and rotatably mounted a piston 152 which is fastened by the pin 153 to the rod 154, which passes snugly through the bore 155 in the right hand end of the said cylinder. On the right hand portion of the rod 154 are screw threads 156 which fit coacting threads formed in the hub 157 of the extension bracket 158 formed on the end of the said cylinder. Formed on the end of the rod 154 is a crank handle 159 suitable for enabling the said rod 154 to be rotated by hand. The left hand end of the cylinder 150 is connected by the pipe 160 to the left hand end of the adjusting cylinder 60, while the right hand ends of the said cylinders are similarly connected by the pipe 161. The two adjusting cylinders 60 and 61 are connected together at each end by the cored passages 162 and 163. If, now, the two adjusting cylinders 60 and 61 and the control cylinder 150 and the pipes and passages connecting them be filled with a practically incompressible fluid, such as oil, and the crank handle 159 be rotated in a clockwise direction, the piston 152 will force the oil from the left hand end of the cylinder 150 into the left hand ends of the adjusting cylinders 60 and 61, and it will there cause the pistons 62 and 63, and consequently the yokes 74 and 75 to move to the right, the extent of such movement being dependent on the extent of movement of the piston 152. As the pistons 62 and 63 move to the right they will exhaust into the right hand end of the control cylinder 150 an amount of oil equal to the amount forced into their left hand ends. Similarly counterclockwise motion of the crank handle 159 will cause the pistons 62 and 63 to be moved back toward the left until they are again at their extreme limit in this direction. To replace any oil leaking from the adjusting cylinders 60 and 61 or control cylinder 150, a reserve supply kept in a tank such as 164 connected to both ends of the cylinders 60 and 61 may be employed, the connecting pipes 165 and 166 being each supplied with a check valve 167 and 168, respectively, which permit the reserve fluid to pass from the said tank 164 to their respective end of the adjusting cylinders 60 and 61, but prevent fluid from passing in the opposite direction.

The control cylinder 150 and its piston 152, rod 154 and crank handle 159 constitute a simple form of hand operated pump which I have used merely for illustration on account of its simplicity. In such a pump leakage past the piston 152 or in other parts of the circuit from one side thereof to the other would soon upset its proper working, since the piston 152 would soon reach its extreme position of motion in one direction when it should be at the other limit of its motion. I, therefore, prefer to replace the said control cylinder 150 and piston 152 and the reserve tank 164 and their connecting pipes, by the hand pump, shown in Figs. 4 and 5, and which I will now describe.

Figure 4:
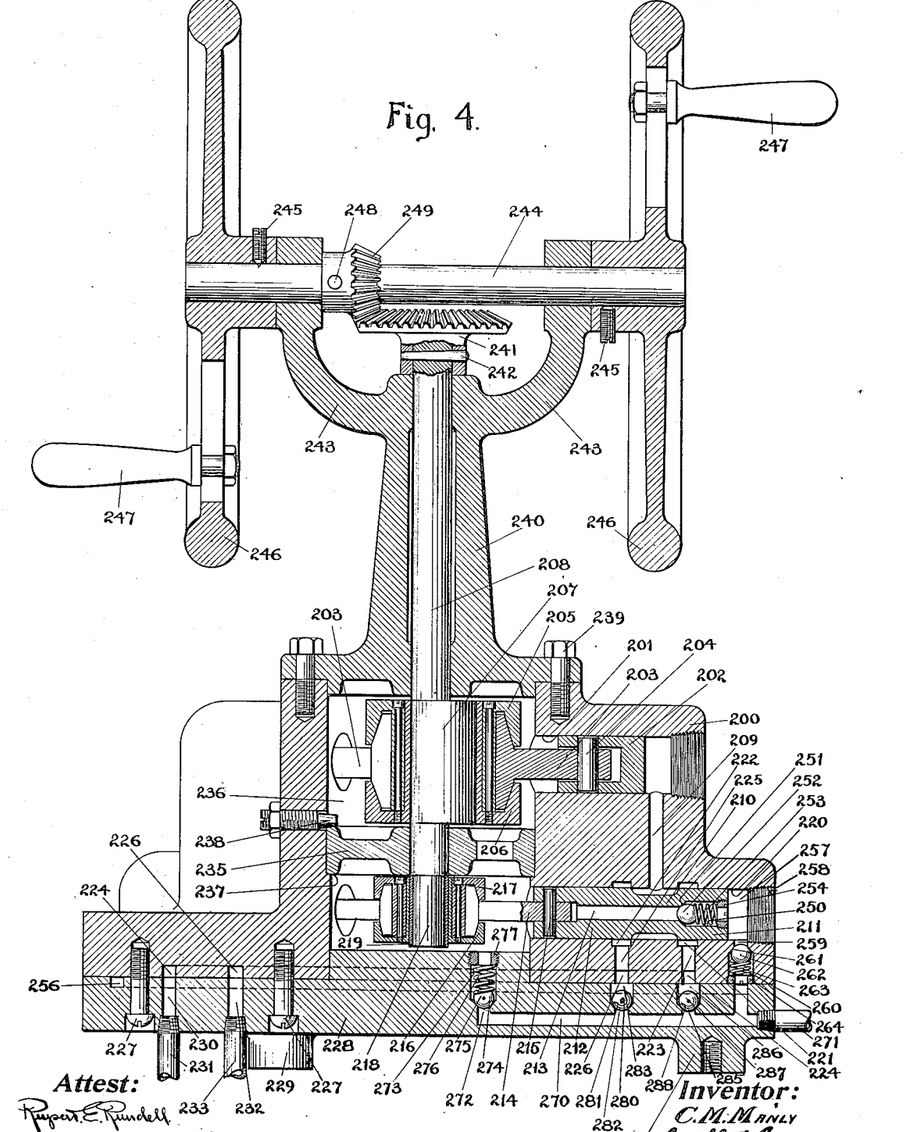
Fig. 4 is a sectional elevation of a preferred form of pump for operating the control mechanism.
Figure 5:
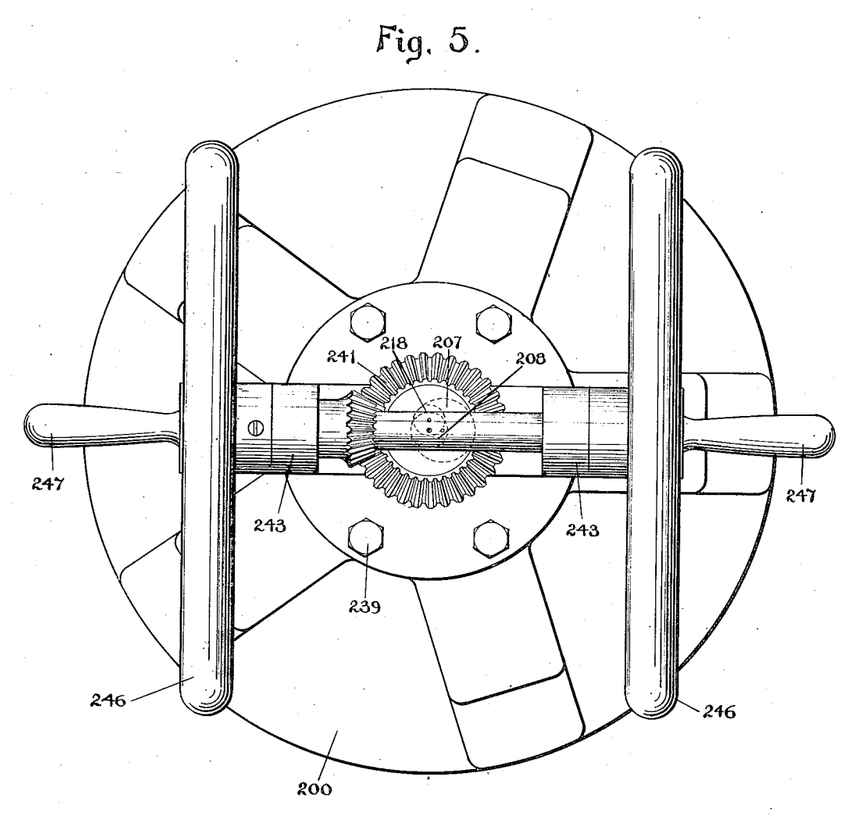
Fig. 5 is a plan view of Fig. 4.

Referring to Figs. 4 and 5, the control pump comprises a main casting 200 in which are formed 5 radial cylinders 201 in each of which is mounted a piston 202, which through their respective connecting rods 203 and pins 204 are joined to the telescoping rings 205 and 206 which are rotatably mounted on the crank pin 207 of the crank shaft 208. Formed in the main casting 200 below the said cylinders 201 are five valve chambers 220, each one of which is in angular alinement with its respective cylinder to which it is connected by the passage 209. Mounted in each of the said valve chambers 220 is a piston valve 210 embodying the two heads 211 and 212. Each valve is pierced by the hole 213, the inner ends of the valves being connected by the pitman rods 214 and pins 215 to the telescoping rings 216 and 217, which are rotatably mounted on the valve crank pin 218 formed on the crank shaft 208. The throw of the said valve crank pin 218 is below the plane of the paper (Fig. 4), being 90 degrees from the throw of the pump crank pin 207 above described, as more clearly seen in Fig. 5. If desired, a bearing bushing such as 219 may be placed between the telescoping ring 216 and the said crank pin 218. Each of the valve chambers 220 is provided with the two counterbored ports 221 and 222, and each of the outer ports 221, in each of the five valve chambers 220, is connected by a passage 223 with the outer annular groove 224 formed in the lower face of the main casting 200, while each of the inner ports 222, in each of the five valve chambers 220, is connected by the passage 225 with the inner annular groove 226, all the inner ports being thus connected together and all the outer ports also connected together.

Secured against the lower face of the main casting 200, by the screws 227, is a circular plate 228 on which are formed supporting lugs 229 by which it may be supported and fastened to any suitable stand. Formed in the plate 228 is a passage 230 which connects the outer annular groove 224 to the pipe 231, and a similar passage 232 connects the inner annular groove 226 to the pipe 233, both of the said pipes 231 and 233 being shown broken in Fig. 4 but the pipe 231 is supposed to be connected to the outer ends of the adjusting cylinders 60 and 61 of the pump in Fig. 3, and the pipe 233 to the inner ends of the said cylinders. The crank shaft 208 is journaled in the bearing 235 in the crank chamber 236, the said bearing being held in position in the said crank chamber by the shoulder 237 and tapered screw 238. The upper portion of the crank shaft 208 is journaled in the pedestal 240, secured to the main casting 200 by the bolts 239, and carries at its end the bevel gear 241 secured to it by the pin 242. Journaled in the arms 243 of the pedestal 240 is the shaft 244 to each end of which is secured, by the screw 245, a hand wheel 246 provided with the handle 247. Secured to the shaft 244 by the pin 248 is a bevel gear 249 which meshes with the bevel gear 241.

Formed in the outer ends of the piston valves 210 are enlarged holes 250 which at their inner ends terminate in the central holes 213 previously described, the shoulders where the holes connect being beveled to form seats 251 for the balls 252 held lightly against them by the springs 253 which abut against the hollow plugs 254. Formed in the upper face of the bottom plate 228 is an annular groove 256, and the space 257 between the outer end of each piston valve and the plug 258 is connected to the said annular groove 256 by a hole 259 and enlarged hole 260, the shoulder formed by the junction of the two holes being beveled to form a seat 261 for the ball 262 held lightly against said seat by the spring 263 abutting against the hollow plug 264. Formed in the bottom plate 228 is a radial hole 270, the outer end of which is connected to the pipe 271, shown broken, while the inner end connects with the axial hole 272 which connects with the enlarged hole 273, the shoulder at the junction of the said holes being beveled to form the seat 274 for the ball 275 held against the said seat with a predetermined force by the spring 276 abutting against the hollow plug 277 which communicates with the crank chamber 236 previously described. If now the cylinders, valve chambers, ports and passages be filled with fluid, and the hand wheels 246 be rotated in either direction, the pistons 202 will force fluid out through either the pipe 231 or the pipe 233, depending on the direction of rotation of the said hand wheels, and if the pipe 233 is connected to the inner end of the adjusting cylinders 60 and 61 of Fig. 3 and the pipe 231 to the outer end of the said cylinders, the improved control pump as now described may be used to replace the elementary control pump shown at the bottom of Fig. 3. Leakage from the control circuit may be replaced by fluid from the reservoir 164 shown at the upper left hand of Fig. 3, as previously described, or this reservoir may be replaced by another one having a single pipe such as 271 connected to the radial hole 270 in the bottom plate 228 of the improved control pump. In this latter case any deficit of fluid in the control circuit will be made up by fluid passing from the said reservoir into the said radial hole 270, from whence it is free to pass into the inner annular groove 226, previously described, by raising the ball 280 resting on the seat 281 formed by the junction of the hole 282 and the enlarged hole 283, if there be deficit of fluid in said annular groove, or it may pass from the said radial hole 270 through the hole 285, and enlarged hole 286 into the outer annular groove 224, if there be a deficit of fluid therein, by raising the ball 287 resting on the seat 288. Since, however, there must in practice always be a small amount of leakage of fluid past the pistons 202 and valves 210 into the crank chamber 236, and such leakage will in time drain a reservoir, I have provided means for returning such leakage back to the control circuit. When the fluid leaking into the crank chamber rises therein to a sufficient height, it is free to pass back of the pitman rods 214 of the valves 210 and into the holes 213 in the said valves, and as the said valves are reciprocated to act as valves they will also act as pistons to draw fluid from the said holes 213 therein past the balls 252 and into the space 257 when they are moved inward, and will on their outward strokes force such fluid so drawn in, past the balls 262 and into the annular groove 256, from whence this fluid is free to pass into either the inner annular groove 226 or outer annular groove 224 if either has a deficit of fluid, or into the reservoir connected to the pipe 271 if neither groove has a deficit. By thus using the valves 210 as a leakage pump, the tank connected to the pipe 271 may be dispensed with and the reserve supply of fluid may be kept in the crank chamber 236. In this latter case, in order to prevent the valves 210 when acting as a leakage pump from overloading the control circuit by creating too high a pressure in the suction side of the control pump, the spring 276 on the ball 275 is made of such a stiffness that when the pressure in the radial hole 270 rises to a predetermined point, the said ball 275 is raised from its seat and the excess fluid forced into said radial hole, by the valves acting as a leakage pump, blows off into the crank chamber 236. I find it advantageous to maintain a slight back pressure in the radial hole 270 and thereby in the suction side of the control pump, as it makes the control pump more sensitive to minute motions of the hand wheel 246.

In applying the improved control pump together with the variable sped gear as previously described, to the controlling of gun pointing, it sometimes happens that the control pump is so situated with reference to the variable speed gear that it is necessary for one of them to be free to move with reference to the other, especially to rotate about a fixed point. As this application presents the greatest difficulties to a successful control, I have illustrated in Figs. 1 and 2 such an application.

Figure 1:
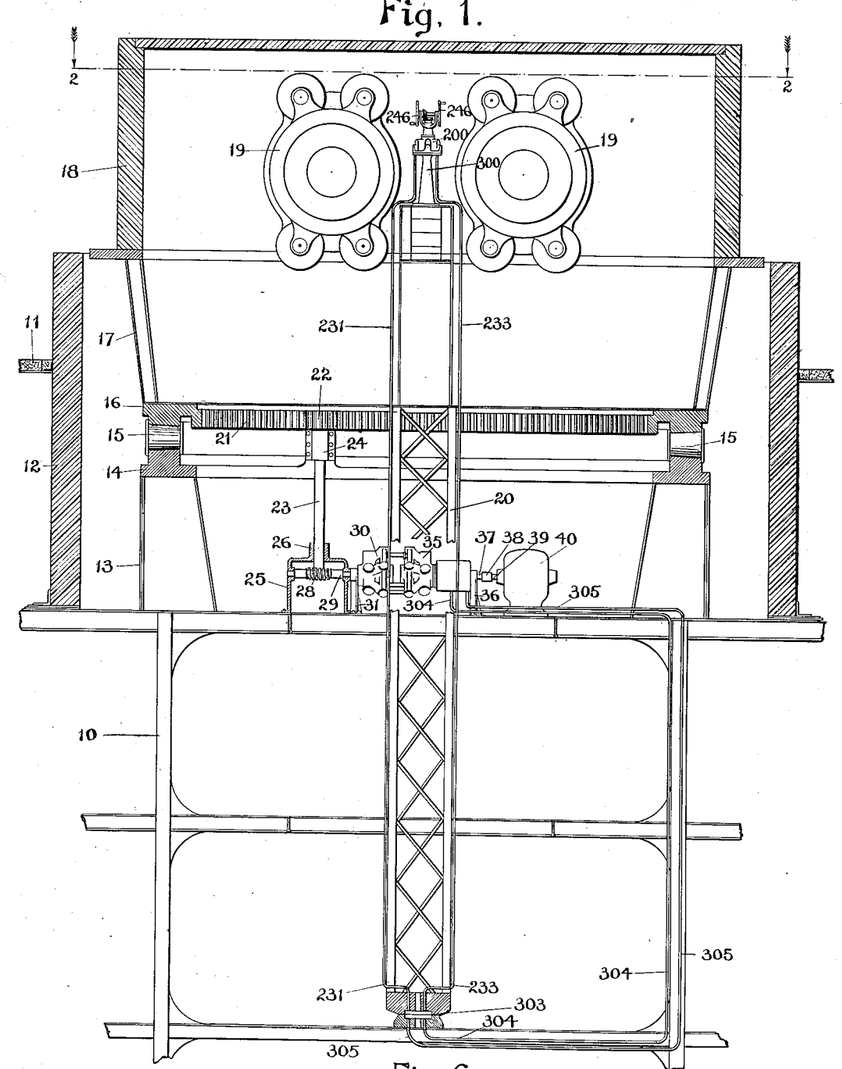
Figure 1 is a sectional elevation through the gun turret of a ship, showing my invention applied thereto.
Figure 2:
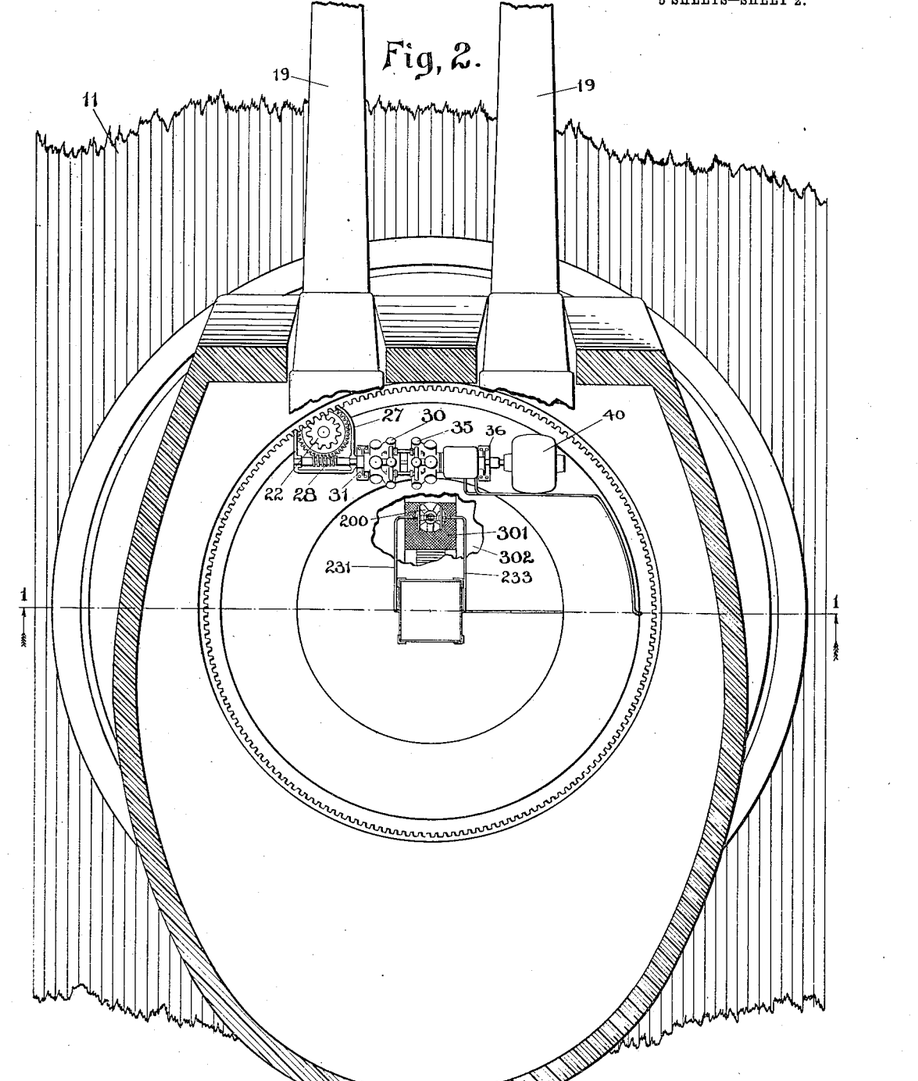
Fig. 2 is a sectional plan view on the line 2—2 Fig. 1 looking in the direction of the arrows, the arrows on line 1—1 showing the direction in which the view in Fig. 1 was taken.
Figure 6:
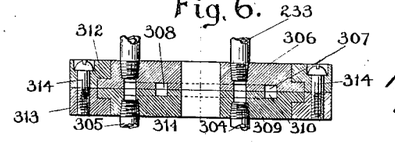
Fig. 6 is a detail view hereinafter explained.

Referring to Figs. 1 and 2, the control pump 200 is shown mounted on the pedestal 300 supported by the raised platform 301, the flooring 302 on which the platform rests being broken away to show the mechanism below it. Leading from the inner annular groove 226 of the control pump, as shown in Fig. 4, the pipe 233 is carried down along the side of the elevator or ammunition hoist, through the lower pivot of the same by means of the swing joint 303 where it connects with the pipe 304 which leads from thence, up by the side of the framing 10, to the inner end of the adjusting cylinders 60 and 61 of the pump 35 of the speed gear. Similarly the pipe 231 leads from the outer annular groove 224 of the control pump, through the swing joint 303 where it connects with the pipe 305 which leads from thence to the outer end of the adjusting cylinders of the pump 35. The swing joint 303, shown in enlarged detail in Fig. 6 enables the pipes 233 and 231 to maintain their connection with the pipes 304 and 305, respectively, even when the turret, and consequently the control pump, is turning with respect to the main body of the ship on which the pump 35 of the speed gear is supported. The swing joint 303 comprises an upper plate 306 provided with the two annular grooves 307 and 308, the pipe 231 from the outer annular grove 224 of the control pump being connected to the outer annular groove 307 and the pipe 233 from the inner annular groove 226 of the control pump being connected to the inner annular groove 308. Rotatably mounted against the lower face of the plate 306 is a similar plate 309 provided with the outer and inner annular groves 310 and 311 in line with the outer and inner annular grooves 307 and 308 respectively of the plate 306, the said plates being held against displacement, but permitted to rotate with reference to each other, by the rings 312 and 313 and the screws 314, the pipes 304 and 305 being connected to the inner and outer annular grooves 311 and 310 respectively from whence they lead to the adjusting cylinders of the pump 35 as previously described.

The operation of the device is as follows; The operator being stationed at the control pump 200, on the platform 301, and the electric motor 40 being supplied with electric current, and the pump and motor of the speed gear, as well as the control pump and the pipes leading from it to the adjusting cylinders of the pump of the speed gear, being filled with a suitable fluid, such as oil, the operator closes the electric circuit (not shown) thereby starting the electric motor and consequently the crank shaft 37 of the pump 35 to which it is connected. Assuming that the stroke of the pump 35 was at zero at starting, the rotation of the electric motor will not cause the pump 35 to send any fluid to the motor 30 and consequently the turret will remain stationary. If the operator desires that the turret turn slowly and in a clockwise direction, he turns the hand wheels 246 of the control pump a minute amount in a clockwise direction, the speed at which the turret will be turned depending on the amount that the hand wheels 246 are turned, since the extent of their movement controls the amount of fluid introduced into the adjusting cylinders of the pump 35, and consequently the extent of the adjustment of the stroke of the said pump. If he desires to stop the turret at any point he has merely to turn the hand wheels 246 in the opposite direction until sufficient fluid has been thereby forced into the opposite end of the adjusting cylinders of the pump 35 to reduce its stroke to zero, the arrival of the pump stroke at zero compelling the turret to stop simultaneously, since the turret cannot turn without turning the motor 30 and the motor 30 cannot turn if the stroke of the pump 35 is at zero, since the motor would be trying to force fluid into the pump cylinders which have at this instant an unchangeable capacity. Similarly if the operator desires to cause the turret to turn counter clockwise he has merely to turn the hand wheels 246 of the control pump in a counter clockwise direction and to an extent dependent on the speed at which he wishes the turret to be turned. If he wishes the turret to turn rapidy he turns the hand wheels a sufficient number of turns to force sufficient fluid into the adjusting cylinders of the pump 35 to cause its stroke to be adjusted to the proper extent to furnish fluid pressure fast enough to the motor 30 to cause the turret to be driven at the desired speed.

In the pointing of large guns on shipboard, the efficiency of the guns, and consequently the efficiency of the ship as a war machine, depends very largely on the accuracy and sensitiveness of the control of the power which operates the pointing mechanism. Not only must the power driving mechanism be capable of moving the gun in either direction at any speed between zero and the maximum desired, since the gun must be kept constantly on an object which may be near or far away and moving at any speed, but as the ship rolls the gun must be simultaneously rolled in the opposite direction and at exactly the same speed that the ship rolls, and consequently the direction of motion of the gun must be reversed exactly in unison with the reversal of direction of rolling of the ship. I find that where the mechanism to be driven by power not only requires frequent reversals as well as frequent changes in its speed, the power can be best controlled by transmitting it through a variable speed gear of the type which I have here shown; and where the changes in speed of the driven mechanism must be controlled to the most minute extent, as in gun pointing, I find that the existence of appreciable lost motion between the operator's hand and the stroke changing mechanism of the pump of the speed gear renders accurate control impossible. In the present control mechanism, the employment as here shown of a practically incompressible fluid for transmitting motions of the operator's hand to effect the adjustment of the stroke of the pump of the speed gear practically eliminates all lost motion, and I have found from practice that with this present control mechanism the fluid driven motor can be controlled absolutely to turn at all speeds from one half revolution per minute to four hundred revolutions per minute in either direction as well as to be brought to zero speed, without in any way changing the speed of rotation of the pump shaft which may revolve constantly at eight hundred revolutions per minute or more. I have furthermore found from practice, that by employing two hand wheels on the control pump, so that the operator may use both hands in operating the control, he is thereby enabled to operate the said control pump smoothly and accurately in exact synchronism with the motions of an independently moving object having even a pendulum like movement, whereby when the said control is applied to the power driving mechanism of guns on shipboard, the operator can cause the gun to move in the reverse direction and in exact synchronism with the rolling of the ship. I have, therefore, shown the device as embodying two hand wheels so situated with reference to each other that in turning them the operator's arms are in a comfortable position permitting him to readily synchronize his manual movements with the relative movements of the ship and the object on which the gun is to be kept pointed.

As the hand wheels 246 are turned by the operator, the piston valves 210 are reciprocated in unison with, but 90 degrees ahead or behind in their phase relation to, their respective pump pistons 202, and while acting as valves they also act as auxiliary or leakage pumps to not only return the leakage of fluid back to the control circuit but also to maintain in the suction side of the control circuit a pressure somewhat greater than atmospheric, which adds materially to the sensitiveness of the control of the speed gear. If desired, however, the pedestal bracket 240 may be lengthened to any amount desired, so as to permit the maintenance of a high column of reserve fluid directly in the crank chamber and the back pressure on the suction side of the control pump can in this way be kept at any amount desired without requiring the valves to act as leakage pumps, and when this is done the ball check valves will be removed from the valves and the relief valve comprising the ball 291 and spring 290 may be dispensed with.

Claims.

1. The combination of a gun, a hydraulic variable speed power mechanism for pointing the gun, and means for varying the speed of movement of the said power mechanism, comprising a manually operatable pump for controlling the variations in speed of the said power mechanism, substantially as described.

2. The combination of a gun, a hydraulic variable speed power mechanism for pointing the gun, and means for varying the speed and direction of movement of the said power mechanism, comprising a manually operatable pump for controlling the variations in speed and direction of movement of the said power mechanism, substantially as described.

3. The combination of a gun, hydraulic power operated means for moving the said gun at variable speeds and in different directions, and means comprising a manually operatable pump for controlling the speed and direction of movement of the said gun, substantially as described.

4. The combination of a gun, variable speed power mechanism for moving the gun at variable speeds in two directions, and means comprising a pump operated by manual power through a hand wheel or crank for controlling the variations in speed and direction of movement of the said gun, substantially as described.

5. The combination of a gun, variable speed power mechanism for moving the gun at variable speeds in two directions, and means comprising a pump operated by manual power through a hand wheel or crank for controlling the variations in speed and direction of movement of the said gun, the said manually operated pump being so arranged that the number and direction of turns of the said hand wheel or crank determine the speed and direction of movement of the said gun, substantially as described.

6. The combination of a gun turret, variable speed power operated means for turning the said turret, and means for varying the speed and direction of movement of the said power operated turning means, said means comprising a manually operatable pump for controlling the variations in speed and direction of movement of the said turning means, substantially as described.

7. The combination of a gun turret, variable speed power operated means for turning the said turret, and means for varying the speed and direction of movement of the said power operated turning means, said means comprising a manually operatable pump for controlling the variations in speed and direction of movement of the said turning means, the said manually operatable pump comprising a hand wheel or crank and being so arranged that the turning of the said hand wheel in one direction from a neutral point causes the turret to be moved in one direction, while the turning of the hand wheel in the opposite direction from the neutral point causes the turret to be turned in the reverse direction, substantially as described.

8. The combination of a gun, a hydraulic variable speed gear operating to turn the said gun in one direction and in the reverse direction, and means for varying the speed of the said gear, said means comprising a manually operatable element embodying two connected hand wheels or crank handles for controlling the speed and direction of operation of the said gear, substantially as described.

9. In speed control mechanism, the combination of variable speed power driving means embodying a pump and a motor driven by said pump, means operating through the said pump for varying the speed of turning of the said motor, stopping the same, reversing its direction of turning and varying its speed in the reverse direction, and means operatable through two interconnected hand wheels or crank handles for controlling the said speed and direction of turning varying means of the said motor, substantially as described.

10. In speed control mechanism, the combination of variable speed power driving means embodying a pump and a motor driven by said pump, means operating through the said pump for varying the speed of turning of the said motor, stopping the same, reversing its direction of turning and varying its speed in the reverse direction, and means comprising a manually operatable pump and a fluid circuit connecting the said pump to the means for varying the speed and direction of turning of the said motor for controlling the same, the said manually operatable pump being so constructed and arranged that the said motor will be caused to be driven in one direction or the reverse direction in accordance with the turning of the said manually operatable pump in one direction or the other from a neutral point, substantially as described.

11. The combination of a rotatable platform, a relatively fixed support for said platform, a variable speed power operated mechanism mounted on said fixed support and connected to said platform to turn the same, means for controlling the variations in speed of the said power mechanism, and a manually operatable pump carried by said platform for operating the said controlling means, substantially as described.

12. The combination of a rotatable platform, a relatively fixed support for said platform, a hydraulic variable speed gear mounted on said fixed support and connected to said platform to turn the same, means for controlling the variations in speed of the said hydraulic gear, and a manually operatable pump carried by said platform for operating the said controlling means, substatially as described.

13. The combination of a gun turret, a gear wheel carried by the said turret, a relatively fixed support for the said turret, a pinion journaled on said support, a hydraulic variable speed gear comprising a pump and a motor for driving the said pinion and mounted on said support, means for controlling the variations in speed of the said speed gear, and a manually operatable pump carried by said turret for operating the said controlling means, substantially as described.

14. In variable speed power mechanism, the combination of a driving device, a driven device, means for varying the speed of the driven device, and means for controlling the said variations in speed, said controlling means embodying a manually operatable pump with means for maintaining a pressure higher than that of the atmosphere simultaneously on both the inlet and outlet sides of the said pump, substantially as described.

15. In variable speed power mechanism, the combination of a driving device, a driven device, means operating through the said driving device for varying the speed of the said driven device, and means for controlling the said variations in speed of the said driven device, said speed control means embodying a manually operatable pump and a fluid pressure conveying means connecting the said pump to the said driving device, but permitting motion of translation of the said pump with respect to the said driving device, substantially as described.

16. In variable speed power mechanism, the combination of a fluid pressure pump, a motor driven at variable speeds by fluid pressure from the said pump, means operating through the said pump for varying the speed of the said motor, and means for controlling the said variations in speed of the said motor, said speed control means embodying a manually operatable pump and a fluid pressure conveying means connecting the said manually operatable pump to the said fluid pressure pump, but permitting motion of translation of the said manually operatable pump with respect to the said fluid pressure pump, substantially as described.

17. The combination of a rotatable platform, hydraulic variable speed mechanism for rotating said platform, means operating through the variable speed mechanism for varying the speed of rotation of the said platform and means for controlling the said speed varying means, said control means embodying a manually operatable pump carried by said platform with fluid pressure conveying means connecting the said manually operatable pump to the said variable speed mechanism, but permitting motion of the said platform with respect to the said variable speed mechanism, substantially as described.

18. The combination of a member to be actuated, hydraulic power operated means for actuating said member, fluid pressure operated means for controlling said actuating means and means independent of said actuating means for generating fluid pressure for operating said controlling means, substantially as described.

19. The combination of a member to be actuated, a hydraulic variable speed power transmitting means for actuating said member, fluid pressure operated means for controlling said actuating means, and means independent of said actuating means for generating fluid pressure for operating said controlling means, substantially as described.

CHARLES MATTHEWS MANLY.

Witnesses:
  CHAS. A. PEARD,
  R. C. POWELL.